(12) United States Patent
Matsuo et al.

(10) Patent No.: US 6,647,190 B2
(45) Date of Patent: Nov. 11, 2003

(54) OPTICAL FIBER HAVING IMPROVED HYDROGEN RESISTANCE

(75) Inventors: Shoichiro Matsuo, Sakura (JP); Tomio Abiru, Sakura (JP); Koichi Harada, Sakura (JP)

(73) Assignee: Fujikura Ltd., Tokyo (JP)

( * ) Notice: Subject to any disclaimer, the term of this patent is extended or adjusted under 35 U.S.C. 154(b) by 0 days.

(21) Appl. No.: 09/969,673

(22) Filed: Oct. 2, 2001

(65) Prior Publication Data
US 2002/0061175 A1 May 23, 2002

(30) Foreign Application Priority Data
Oct. 3, 2000 (JP) ........................................ 2000-304140

(51) Int. Cl.⁷ ................................................. G02B 6/02
(52) U.S. Cl. ........................ 385/123; 385/141; 385/142; 385/144
(58) Field of Search ................................. 385/100, 102, 385/109, 123, 124, 126, 127, 128, 141, 142, 144

(56) References Cited

U.S. PATENT DOCUMENTS

| 4,385,802 | A |   | 5/1983 | Blaszyk et al. |
| 5,596,668 | A |   | 1/1997 | DiGiovanni et al. |
| 5,802,235 | A | * | 9/1998 | Akasaka ..................... 385/123 |
| 5,838,866 | A |   | 11/1998 | Antos et al. |
| 6,343,175 | B1 | * | 1/2002 | Sasaoka ..................... 385/123 |
| 6,351,588 | B1 | * | 2/2002 | Bhatia et al. ............... 385/123 |

FOREIGN PATENT DOCUMENTS

| EP | 0 772 061 A1 | 5/1997 |
| JP | 61-158304 | 7/1986 |
| JP | 01-102507 | 4/1989 |
| JP | 9-15464 | 1/1997 |
| JP | 09-171120 | 6/1997 |
| JP | 9-171120 | 6/1997 |
| JP | 09-258054 | 10/1997 |
| JP | 9-269432 | 10/1997 |

OTHER PUBLICATIONS

Blankenship, M., et al., "Short–term transient attenuations in single–mode optical fibers due to hydrogen," Optical Fiber Communication Conference, OFC/IOOC '87, Technical Digest, Reno, Nevada Jan. 19–22, 1987, 2 pages.

Noguchi, K., et al., "Optical Fiber Loss Increase Due to Hydrogen and Long–Term Loss Stability for Optical Fiber Cables," Journal of Institute of Telecommunications Engineers, 85/7, vol. J68–B, No. 7, pp. 795–802.

* cited by examiner

*Primary Examiner*—John D. Lee
*Assistant Examiner*—Jennifer Doan
(74) *Attorney, Agent, or Firm*—Bell, Boyd & Lloyd LLC

(57) ABSTRACT

The present invention relates to an optical fiber having improved hydrogen-resistance properties. The optical fiber includes a high concentration germanium layer and a low concentration germanium layer. The high concentration germanium layer is disposed at a central position of the optical fiber and contains germanium oxide in a concentration of 0.1% by weight or more, relative to the total weight of the high concentration germanium layer. The low concentration germanium layer is disposed around the high concentration germanium layer and contains germanium oxide in a concentration of less than 0.1% by weight, relative to the total weight of the low concentration germanium layer. The ratio of optical power leaking from the high concentration germanium layer to the low concentration germanium layer in an employed wavelength band is 0.4% or less, relative to the total optical power propagating through the optical fiber.

6 Claims, 11 Drawing Sheets

LAYERS PRODUCED BY VAD METHOD

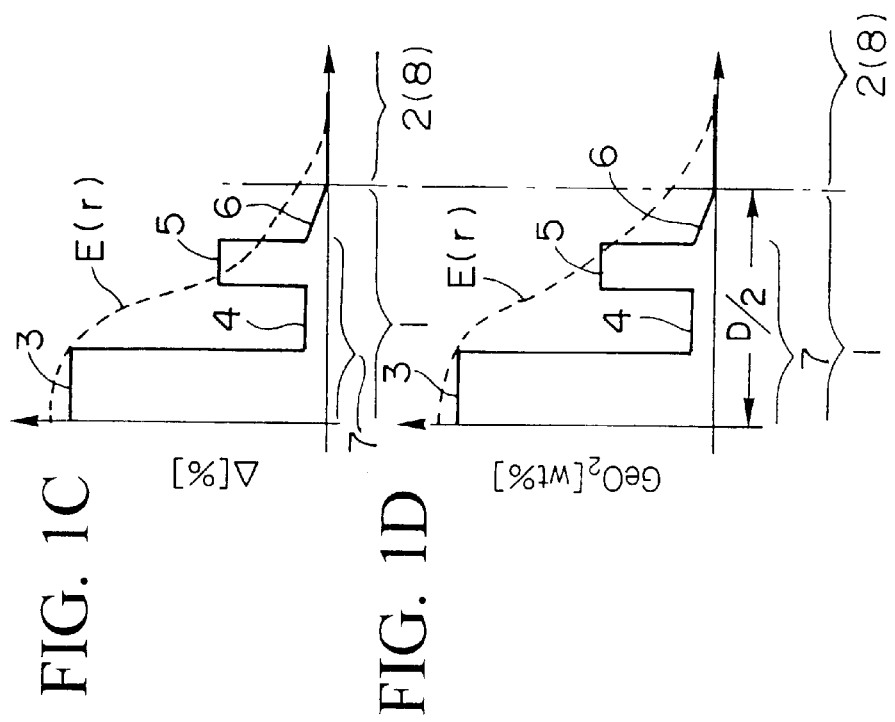
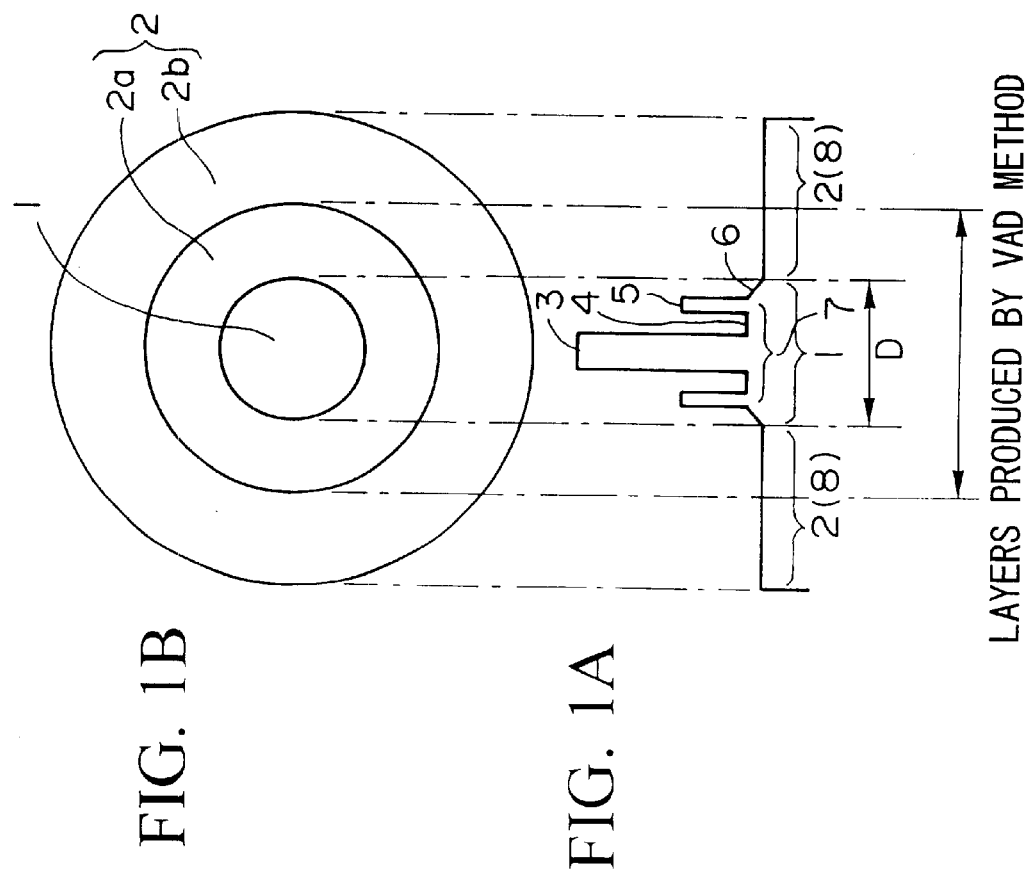

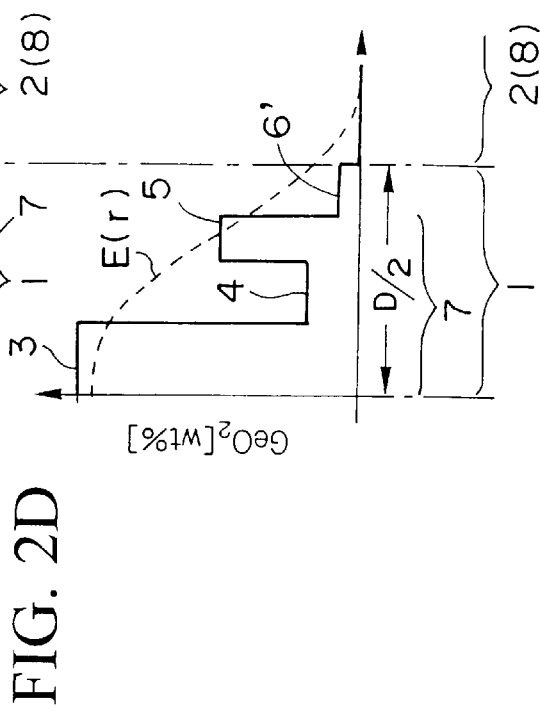
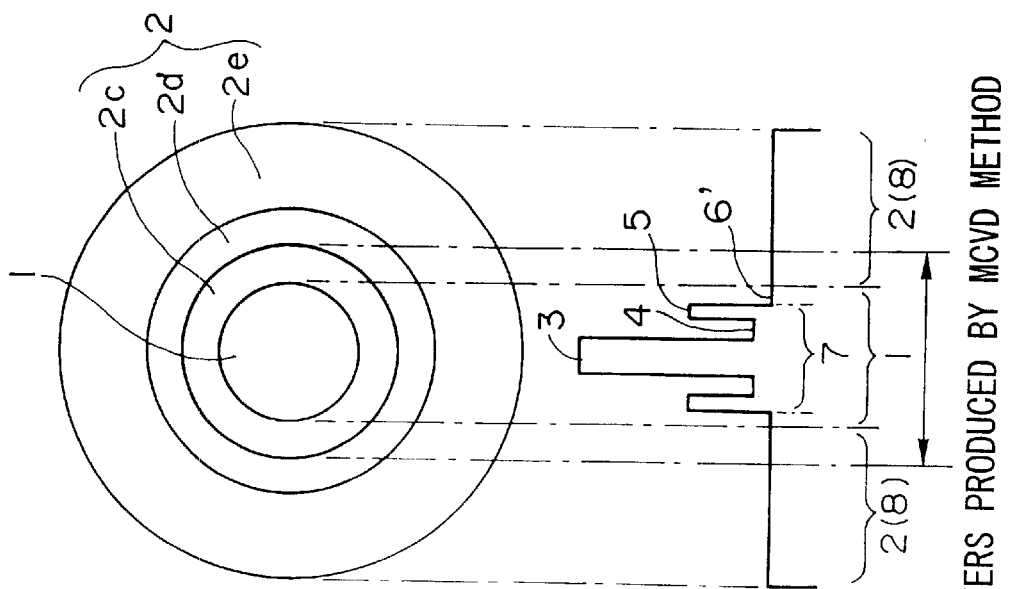

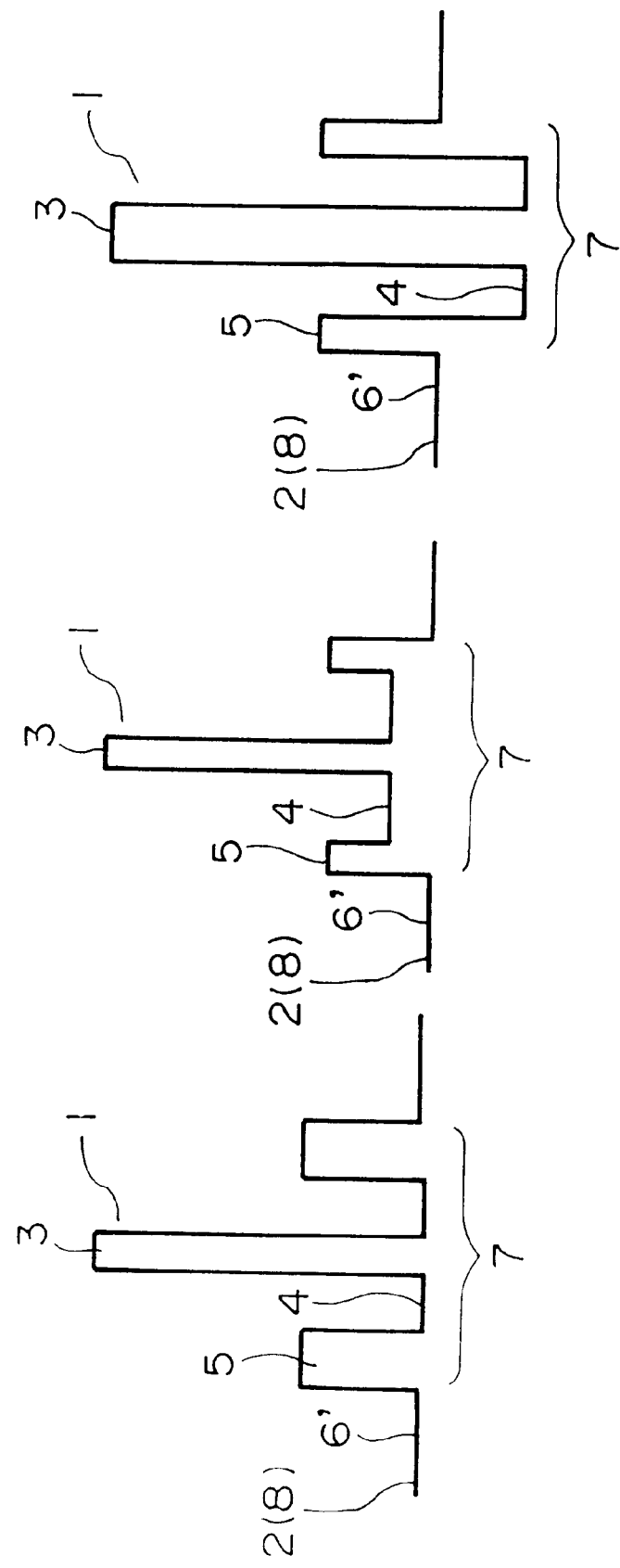

OPTICAL FIBER HAVING IMPROVED HYDROGEN RESISTANCE

BACKGROUND OF THE INVENTION

1. Field of the Invention

The present invention relates to an optical fiber having an improve hydrogen-resistance property.

2. Description of Related Art

The hydrogen-resistance property is one of the properties of an optical fiber made of silica glass, which are important for transmission characteristics of the optical fiber.

FIG. 11 is a graph indicating the relationship between wavelength and loss before and after hydrogen exposure of a typical optical fiber under conditions in which it is exposed to 100% hydrogen at 30° C. for 21 hours. In the following, the hydrogen exposures are carried out under the same conditions.

In FIG. 11, curve A shows the amount of the loss before exposure, and curve B shows the amount of the loss after exposure. In order to clarify the effects of the hydrogen exposure, the loss increase before and after hydrogen exposure is indicated by curve C in FIG. 12.

By the exposure to hydrogen, a high peak of loss increase is generated near 1530 nm, and a low peak of the loss increase is generated near 1580 nm. The peak near 1580 nm is caused by only the effect of hydrogen, and the peak near 1530 nm is caused by a combined effect of hydrogen and peroxyl radicals existing in an optical fiber as described below.

Curve D shows the loss increase calculated by subtracting the loss increase caused by only the effect of hydrogen from the loss increase shown by the curve C, in which the low peak near 1580 nm is almost extinguished, and the high peak near 1530 nm relatively remains.

Since the wavelength used for multiple purposes in a general optical communication system is within the so-called C band region (1530 to 1560 nm), sequential changes of the loss caused near 1530 nm by hydrogen significantly affect transmission properties of an optical fiber.

In recent years, Wavelength Division Multiplexing (WDM) systems using a wavelength region centering at 1550 nm are often used.

An amplifier system, which compensates loss wavelength properties of an optical fiber in a broad region, for example, of 1530 to 1560 nm, is previously used in this system.

However, when the loss wavelength properties are sequentially changed by hydrogen entering the optical fiber, the amplifier system cannot compensate for the loss wavelength properties of the optical fiber, thus resulting in it significantly affecting the entire system.

The loss peak near 1530 nm is generated by the following effects.

When a peroxyl linkage represented by the following chemical formula:

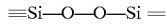  Chemical Formula 1 exists in an optical fiber preform produced under an excessive oxygen atmosphere, the peroxyl linkage is decomposed to yield peroxyl radicals represented by the following chemical formula:

.  Chemical Formula 2 in an optical fiber produced by melting and spinning from the optical fiber preform under certain conditions. When hydrogen enters this optical fiber, it reacts with the peroxyl radicals to yield Si—O—O—H species which cause the loss near 1530 nm. The Si—O—O—H species finally loses an oxygen atom to form Si—OH species which absorbs at 1380 nm. Once the Si—OH species is formed, even when it is exposed to hydrogen, absorption at 1530 nm is not caused.

In order to suppress the loss increase, a method in which conditions for melting and spinning are optimized to reduce generation of peroxyl radicals in an optical fiber is proposed. Moreover, a method in which an optical fiber is pretreated under a hydrogen atmosphere is proposed.

However, these methods have various problems in that manufacturing equipment is limited and complicated steps are required to produce the optical fiber.

With regard to the structure of an optical fiber, various studies have been carried out. For example, Japanese Unexamined Patent Application, First Publication No. Hei 9-15464 discloses an optical fiber including a core produced by sequential lamination, a vapor deposited clad layer, and a tube leading-out clad layer, in which the tube leading-out clad layer has a hydrogen getter site including materials selected to trap hydrogen in order to substantially prevent the diffusion of hydrogen into the vapor deposited clad layer at the time of producing the optical fiber.

However, the optical fiber has various problems in that the production method is limited, and it cannot be used to provide a multipurpose refractive index profile.

Japanese Unexamined Patent Application, First Publication No. Hei 9-171120 discloses an optical fiber including a core produced by sequential lamination, an inner clad, and an outer clad, in which germanium is added into the inner clad to which propagating optical power spreads from the core, so as to prevent formation of the peroxyl linkage, which is represented by the Chemical Formula 1 described above and is caused by excess oxygen, and the loss caused by reaction between the hydrogen and the peroxyl linkage.

However, Japanese Unexamined Patent Application, First Publication No. Hei 9-171120 merely vaguely discloses that a considerable amount of light propagates to the inner clad region doped with germanium. Moreover, only a specific refractive index profile in which the inner clad region and the outer clad region are made from essentially the same material is studied. Therefore, the optical fiber disclosed in Japanese Unexamined Patent Application, First Publication No. Hei 9-171120 cannot simply be applied to various refractive index profiles as now proposed.

Specifically, progressive change of the loss near 1530 nm tends to affect in a WDM system. In contrast, although an optical fiber having a relatively complicated refractive index profile is proposed to be suitable for a WDM system, it tends to be difficult to apply this complicated refractive index profile to a conventional method and to provide a stable system.

SUMMARY OF THE INVENTION

The present invention is achieved in view of the circumstances described above. An object of the present invention is to provide an optical fiber having an improved hydrogen-resistance property.

An object of the present invention is to provide an optical fiber in which the loss peak specifically near 1530 nm caused by linkage between peroxyl radicals and hydrogen is suppressed.

Moreover, an object of the present invention is to provide an optical fiber which can be applied to various refractive index profiles, and has a hydrogen-resistance property which suppresses the loss peak specifically near 1530 nm.

In order to solve the problems described above, the present invention provides an optical fiber comprising a high concentration germanium layer and a low concentration germanium layer, wherein the high concentration germanium layer is disposed at a central position of the optical fiber and contains germanium oxide in a concentration of 0.1% by weight or more, relative to the total weight of the high concentration germanium layer, the low concentration germanium layer is disposed around the high concentration germanium layer and contains germanium oxide in a concentration of less than 0.1% by weight, relative to the total weight of the low concentration germanium layer, and the ratio of optical power leaking from the high concentration germanium layer to the low concentration germanium layer in an employed wavelength band is 0.4% or less, relative to the total optical power propagating through the optical fiber.

Moreover, the present invention provides an optical fiber comprising a high concentration germanium layer and a low concentration germanium layer, wherein the high concentration germanium layer is disposed at a central position of the optical fiber and contains germanium oxide in a concentration of 0.1% by weight or more, relative to the total weight of the high concentration germanium layer, the low concentration germanium layer is disposed around the high concentration germanium layer and contains germanium oxide in a concentration of less than 0.1% by weight, relative to the total weight of the low concentration germanium layer, an external diameter of the high concentration germanium layer is at least 2.6 times that of a mode field diameter in an employed wavelength band.

In the optical fiber, the low concentration germanium layer may include a clad, the high concentration germanium may include a core and an intermediate layer disposed between the core and the clad, and the maximum refractive index of the core may be 0.25% or more higher than that of the intermediate layer.

In the optical fiber, a dopant other than germanium oxide may be added together with the germanium oxide in the high concentration germanium layer.

BRIEF DESCRIPTION OF THE DRAWINGS

FIGS. 1A and 1B are schematic diagrams showing a structure of an optical fiber of the first embodiment according to the present invention;

FIG. 1C shows a refractive index profile of the optical fiber; and

FIG. 1D shows a concentration distribution of germanium oxide in the optical fiber.

FIGS. 2A and 2B are schematic diagrams showing a structure of an optical fiber of the second embodiment according to the present invention;

FIG. 2C shows a refractive index profile of the optical fiber; and

FIG. 2D shows a concentration distribution of germanium oxide in the optical fiber.

FIGS. 3A, 3B and 3C show refractive index profiles of optical fibers used for examining the relationship between the ratio of leaking optical power and the loss peak.

DETAILED DESCRIPTION OF THE INVENTION

Figure 4:
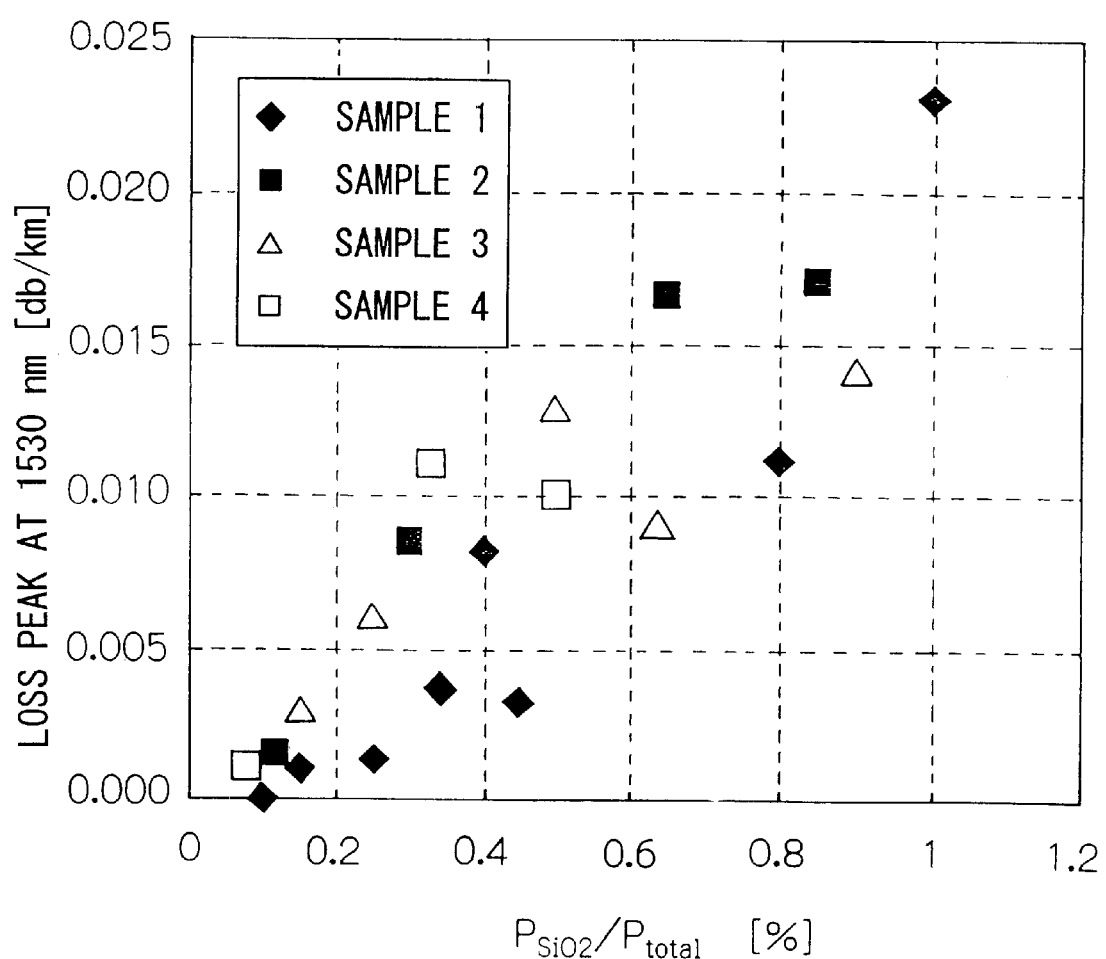
FIG. 4 is a graph showing the relationship between the ratio of leaking optical power and the loss peak.

In the present invention, an employed wavelength band is selected according to an intended purpose; for example, it is selected from a wavelength region near 1.55 $\mu$m. A specific example of the employed wavelength band includes the C band region (1530 to 1560 nm) described above.

First, the present invention will be explained in detail by way of two embodiments.

(1) First Embodiment

FIGS. 1A to 1D show an optical fiber having a segment core type refractive index profile, which is produced by a VAD (Vapor-phase Axial Deposition) method.

Although an actual refractive index profile has a rounded peak and trough shape, FIG. 1C shows a typical example of a refractive index profile. The refractive index profile is suitable for enlarging an effective core cross-sectional area ($A_{eff}$) required in a WDM transmission line and is suitable for suppressing a dispersed slope.

This optical fiber is constituted of a high concentration germanium layer 1 including 0.1% by weight or more of germanium oxide, and a low concentration germanium layer 2 including less than 0.1% by weight of germanium oxide, which is disposed around the high concentration germanium layer 1 and has a constant refractive index.

The upper limit of concentration of germanium oxide included in the high concentration germanium layer 1 is described below. The lower limit of the concentration of germanium oxide included in the low concentration germanium layer 2 is zero.

In this embodiment, only germanium oxide is added as a dopant to pure silica glass. Since germanium causes an increase in the refractive index, as shown in the refractive index profile shown in FIG. 1C and the concentration distribution of germanium oxide shown in FIG. 1D, the pattern of the refractive index profile is identical to that of the concentration distribution of germanium oxide, and the refractive index in the high concentration germanium layer 1 is higher than that in the low concentration germanium layer 2.

The high concentration germanium layer 1 is constituted of a core 7 including a center core 3 formed by lamination from the central position, an intermediate portion 4, and a ring core 5, and of an intermediate layer 6 formed on a circumference of the core 7.

The low concentration germanium layer 2 is constituted of a clad 8. The intermediate layer 6 is formed between the core 7 and the clad 8.

The refractive index in the intermediate portion 4 is lower than that in the center core 3, and the refractive index in the ring core 5 is lower than that in the center core 3 and is higher than that in the intermediate portion 4.

The refractive index in the intermediate layer 6 gradually decreases outwardly, and becomes almost identical at the boundary between the intermediate layer 6 and the low concentration germanium layer 2 to that in the low concentration germanium layer 2.

The low concentration germanium layer 2 includes an inner layer 2a and an outer layer 2b. The high concentration germanium layer 1 and the inner layer 2a are produced by sequential steps according to a VAD method. The outer layer 2b is produced by an outside vapor phase deposition method in which silica dioxide particles are deposited onto the outside of the inner layer 2a.

In a typical optical fiber, a central region where the refractive index is high is a core region, and a region around the core region, in which the distribution of the refractive index maintains an almost constant level and the refractive index is lower than that of the core region, is a clad region. In this embodiment, the core region includes the region from the center core 3 to the ring core 5, and the clad region includes the region of the low concentration germanium layer 2. Moreover, the intermediate layer 6 is formed between the core 7 and the clad 8.

In order to use the optical fiber as a transmission line, the maximum refractive index of the core 7 is set to be 0.25% (by relative refractive index difference) or more higher than that of the intermediate layer 6. The maximum value of the refractive index of the core 7 is not specifically limited. For example, although the relative refractive index difference of an optical fiber used for WDM transmission is usually set to be 1.0% or less, the relative refractive index difference of an optical fiber used for dispersion compensation may be set to be more than 1.0%.

Thus, the intermediate layer 6 in which the maximum refractive index is lower than that of the core 7 is formed between the high concentration germanium layer 1 and the low concentration germanium layer 2, and the refractive index and the diameter of the intermediate layer 6 are regulated independently of the core 7, so as to control the ratio of the optical power leaking from the high concentration germanium layer 1 to the low concentration germanium layer 2 while satisfying desired optical properties.

Preferably, the refractive index and the distribution of the refractive index of the intermediate layer 6 can be controlled to suitably produce an optical fiber having desired optical properties. For example, when the refractive index of the intermediate layer 6 is higher than that of the clad 8, the cut-off wavelength becomes longer, which may cause undesirable spread of the refractive index distribution. Thereby, the refractive index of the intermediate layer 6 may be required to be controlled.

The external diameter of the core 7 and the width of the intermediate layer 6 can be determined in accordance with the desired refractive index or the desired distribution of the electric field caused by the refractive index, and can be suitably changed in accordance with desired conditions.

Curved lines E(r) shown in FIGS. 1C and 1D shows broadening of an electric field in an optical fiber at 1550 nm in an employed wavelength band. As shown in these drawings, although light mainly propagates in the center of the optical fiber, that is, in the high concentration germanium layer 1, light slightly leaks into the surroundings of the high concentration germanium layer 1, that is, the low concentration germanium layer 2.

In the optical fiber according to the present invention, the ratio of the optical power leaking from the high concentration germanium layer 1 to the low concentration germanium layer 2 is set to be 0.4% or less, and more preferably 0.2% or less, relative to the total optical power propagating through the optical fiber. As shown in experimental results described below, when the ratio of the leaking optical power is more than 0.4%, it may be impossible to improve hydrogen-resistance properties.

The ratio of the leaking optical power can be alternatively represented by a mode field diameter (referred to as MFD, hereinafter) which shows the extent of the electric field of light propagating through the optical fiber. That is, the external diameter D of the high concentration germanium layer 1 is set to be at least 2.6 times, more preferably at least 2.8 times that of the MFD, in order to form the same structure as that produced by setting the ratio of the leaking optical power to be 0.4% or less, more preferably 0.2% or less, as described above. Among these conditions imposed on the ratio of the leaking optical power and the external diameter D, when one is satisfied, the other is necessarily satisfied.

Therefore, the optical fiber according to the present invention can be specified by either the ratio of the leaking optical power or the ratio of an external diameter D of the high concentration germanium layer 1 to MFD, which is selected in accordance with desired conditions.

The ratio of the leaking optical power and MFD can be suitably controlled in accordance with the refractive index profile of the high concentration germanium layer 1. The refractive index profile includes the external diameter or the refractive index of each layer. Since values in the refractive index profile are changed in accordance with an employed wavelength band, the optimum conditions in the employed wavelength band previously selected are preferably set.

(2) Second Embodiment

FIGS. 2A to 2D show a segment core type optical fiber produced by a MCVD (Modified Chemical Vapor-phase Deposition) method. Among compositions shown in FIGS. 2A to 2D, compositions identified with the composition shown in FIGS. 1A to 1D are represented by the same symbols as those of FIGS. 1A to 1D, and explanations thereof are omitted.

The refractive index profile of the second embodiment is similar to that of the first embodiment except that the distribution of the refractive index of an intermediate layer 6' around a ring core 5 maintains a constant level which is matched with the refractive index of a low concentration germanium layer 2 (clad 8).

According to the MCVD method, a starting silica tube, for example, is horizontally disposed in a longitudinal direction, into which silica tetrachloride, germanium tetrachloride, and the like, are sent in vapor phases, and are heated to react with each other by means of a burner disposed at the outside of the starting silica tube. Thereby, silica dioxide particles, germanium dioxide particles, and the like, are deposited onto an inner wall of the starting silica tube, resulting in production of an optical fiber preform.

As shown in FIGS. 2A and 2B, the low concentration germanium layer 2 is constituted of a starting silica tube 2d, an inner layer 2c formed in the inside of the starting silica tube 2d, and an outer layer 2e formed at the outside of the starting silica tube 2d. A high concentration germanium layer 1 and the inner layer 2c are formed in the inside of the starting silica tube 2d by the MCVD method, and the outer layer 2e is formed by an outside vapor phase deposition method.

FIG. 2C shows a refractive index profile and FIG. 2D shows the concentration distribution of germanium oxide. In the high concentration germanium layer 1, fluorine, which decreases the refractive index, is added together with germanium oxide.

The refractive index profile of the high concentration germanium layer 1 is approximately proportional to the concentration of germanium oxide, and the refractive index of the intermediate layer 6' is matched with the refractive index of the low concentration germanium layer 2 by adding fluorine.

In the second embodiment, the ratio of the optical power leaking from the high concentration germanium layer 1 to the low concentration germanium layer 2 is 0.4% or less, and more preferably 0.2% or less, relative to the total optical power propagating through the optical fiber, in the same manner as described in the first embodiment. The external diameter D of the high concentration germanium layer 1 is at least 2.6 times, more preferably at least 2.8 times that of the MFD.

Fluorine described above is added to control the refractive index of each layer. Therefore, fluorine may be added in only a portion of the high concentration germanium layer 1, in which the refractive index is required to be decreased, or alternatively, in an entire portion of the high concentration germanium layer 1 while regulating the amount of fluorine to be added. The concentration of fluorine added is not specifically limited, and can be suitably determined in accordance with the intended use.

A dopant which can be added into the high concentration germanium layer 1 is not limited to fluorine, and various species such as boron can be used as a dopant. Since germanium has an effect of increasing the refractive index and fluorine is generally known as a material having an effect of decreasing the refractive index, fluorine is generally used as the dopant.

Thus, by adding the dopant together with germanium oxide, an optical fiber having a complex refractive index profile can be produced. For example, a portion having a lower refractive index than that of the clad 8 can be formed in the inside of the high concentration germanium layer 1. Moreover, the increase of the refractive index in the intermediate layer 6', which is caused by adding germanium, can be suppressed, and the ratio of the optical power leaking into the low concentration germanium layer 2 can be controlled without affecting optical properties determined by the refractive index distribution in the core 7.

Although only one example in which fluorine is added together in the optical fiber produced by the MCVD method is described above, fluorine can be added together in an optical fiber produced by another method such as a VAD method or the like.

In the following, the relationship between the ratio of the optical power leaking from the high concentration germanium layer 1 to the low concentration germanium layer 2 and the loss peak near 1530 nm, which is caused by hydrogen exposure, will be explained in detail by way of examinations in which optical fibers are really produced.

FIGS. 3A to 3C show the refractive index profiles of optical fibers used in the experiments. All of these optical fibers are produced by the MCVD method used above in the second embodiment.

In FIG. 3A, the refractive indexes in the intermediate portion 4, the intermediate layer 6', and the low concentration germanium layer 2 which is at the outside of the intermediate layer 6', are identical with each other. In FIG. 3B, the refractive indexes in the intermediate layer 6' and the low concentration germanium layer 2 are identical with each other, and the refractive index in the intermediate portion 4 is higher than those of the intermediate layer 6' and the low concentration germanium layer 2. In FIG. 3C, the refractive indexes in the intermediate layer 6' and the low concentration germanium layer 2 (the clad 8) are identical with each other, and the refractive index in the intermediate portion 4 is lower than those of the intermediate layer 6' and the low concentration germanium layer 2. In order to produce optical fibers having various refractive index distribution profiles, fluorine is added together into the high concentration germanium layer 1 and the intermediate layer 6' as necessary.

In the present invention, the upper limit of the amount of germanium oxide to be added is not specifically limited in portions such as the center core 3 and the ring core 5, in which the refractive index is high. However, the upper limit of the amount of germanium oxide to be added is required to be 1.0% by weight in portions such as the intermediate portion 4 shown in FIG. 3C, in which the relative refractive index difference based on the refractive index of the low concentration germanium layer 2 is less than −0.1%. When the amount of germanium oxide to be added is within a range from 0.1 to 1.0% by weight, hydrogen-resistance properties can be improved. When the amount of germanium oxide to be added is more than 1.0% by weight, the transmission loss is considerably increased by Rayleigh scattering loss caused by excess germanium. When fluorine is added to decrease the refractive index increased by 1.0% by weight or more of germanium, the amount of fluorine added is increased, which also results in the considerable increase of the transmission loss caused by Raleigh scattering loss.

Table 1 shows the figure number corresponding to the refractive index profile of four produced optical fibers (Samples 1 to 4) and measured values of optical properties our optical fibers.

TABLE 1

| Sample Number | Figure Number of Refractive Index Profile | MFD (1550 nm) μm | Wavelength Dispersion (1550 nm) ps/km/nm | Dispersion Slope (1550 nm) ps/km/nm² |
|---|---|---|---|---|
| 1 | FIG. 3A | 9.4 | −2.5 | 0.110 |
| 2 | FIG. 3A | 8.4 | −2.5 | 0.065 |
| 3 | FIG. 3B | 9.3 | 4.0 | 0.088 |
| 4 | FIG. 3C | 8.4 | 4.0 | 0.046 |

Figure 11:
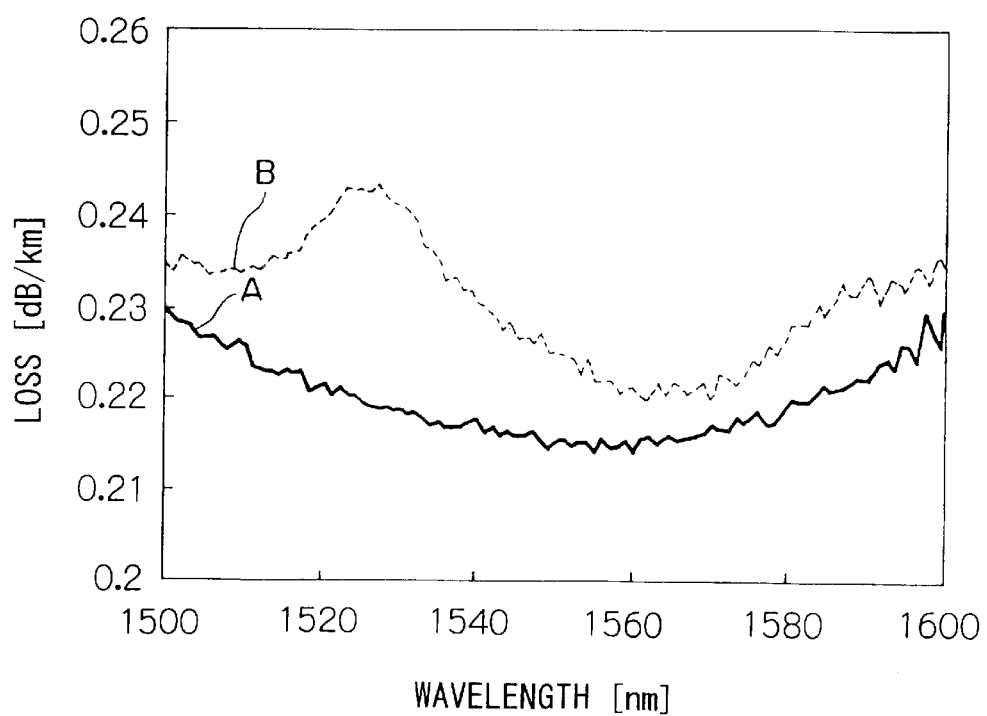
FIG. 11 is a graph showing the relationship between the wavelength and the loss of a typical optical fiber before and after hydrogen exposure.

FIG. 4 is a graph showing the relationship between the ratio of the optical power from the high concentration germanium layer to the low concentration germanium layer to the total optical power [$P_{SiO_2}/P_{total}$ (%)] and the magnitude of the loss peak generated near 1530 nm after hydrogen exposure as is generated in the graph of FIG. 11.

The leaking optical power $P_{SiO_2}$ and the total optical power $P_{total}$ are defined by the following formula:

$$P_{total} = \int_0^{rclad} rE^2(r) dr$$

-continued $$P_{SiO2} = \int_{rdoped}^{rclad} rE^2(r)dr$$

(wherein r represents a radius, E(r) represents the distribution of an electric field, $r_{doped}$ represents a radius of the high concentration germanium layer, and $r_{clad}$ represents a half the thickness of the clad layer).

As shown in this graph, the ratio $[P_{SiO2}/P_{total} (\%)]$ is proportional to the magnitude of the loss peak. The magnitude of the loss peak is preferably small. When the magnitude of the loss peak is 0.01 dB/km or less, more preferably 0.005 dB/km or less, effects on transmission properties and the entire optical fiber system can be suppressed to the degree which makes the optical fiber sufficiently practical.

As shown in this graph, the ratio $[P_{SiO2}/P_{total} (\%)]$ may be set to be 0.4% or less in order to set the magnitude of the loss peak to be 0.01 dB/km or less, and the ratio $[P_{SiO2}/P_{total} (\%)]$ may be set to be 0.2% or less in order to set the magnitude of the loss peak to be 0.005 dB/km or less.

The ratio $[P_{SiO2}/P_{total} (\%)]$ can be decreased by increasing the external diameter of the high concentration germanium layer. Therefore, the lower limit of the external diameter of the high concentration germanium layer is determined in accordance with the determined value of the ratio $[P_{SiO2}/P_{total}]$. In view of productivity, the upper limit of the external diameter of the high concentration germanium layer is determined in accordance with a production method such as a VAD method or an MCVD method or by a production device.

As described above, MFD can be used as a parameter which is effective for defining the external diameter of the high concentration germanium layer and is alternative to the ratio $[P_{SiO2}/P_{total} (\%)]$.

The preferable ranges of the ratio of the leaking optical power and the ratio of the external diameter of the high concentration germanium layer to MFD, which are described above, are applied to an optical fiber preform as well as the optical fiber produced by drawing the optical fiber preform. Specifically, in a process of the MCVD method or the CVD method, the ratio of the leaking optical power and the ratio of the external diameter of the high concentration germanium layer to MFD of the optical fiber preform can also be evaluated with considerable accuracy.

Therefore, the suitable range of the high concentration germanium layer can be set in a producing step of the optical fiber preform.

Although the optical fiber having the segment core type refractive index profile is described by way of the example, the type of the refractive index profile of the optical fiber is not specifically limited, and various types of the refractive index profile, such as the so-called step type, W type, O-ring type, or the like, can be applied.

The step type refractive index profile is constituted of, for example, a center core produced by lamination from the central position, a side core, and a clad, of which refractive indexes are gradually decreased from the center core. The W type refractive index profile is constituted of, for example, a center core produced by lamination from the central position, a side core, and a clad, of which refractive indexes are set to be decreased in order of the center core, the clad, and the side core. The O-ring type refractive index profile includes a core having two or more layers in which a surrounding core is disposed around a center core and the refractive index of the surrounding core is higher than that of the center core.

In order to improve hydrogen-resistance properties in optical fibers having these refractive index profiles, it is preferable to control the ratio of leaking optical power to be under the determined value in the present invention by disposing an intermediate layer between the core and the clad.

The optical fiber according to the present invention can be used for various purposes, such as dispersion compensation or the like, as well as for transmission, such as WDM transmission.

EXAMPLES

In the following, the optical fiber according to the present invention will be specifically explained by way of examples. In all of the examples, the wavelength employed (measured wavelength) is set to 1550 nm.

Example 1

According to an MCVD method, an optical fiber preform was produced from silica glass and then was drawn to produce an optical fiber. This optical fiber had optical properties similar to that of Sample 4 shown in Table 1 and FIG. 4.

Figure 5A:
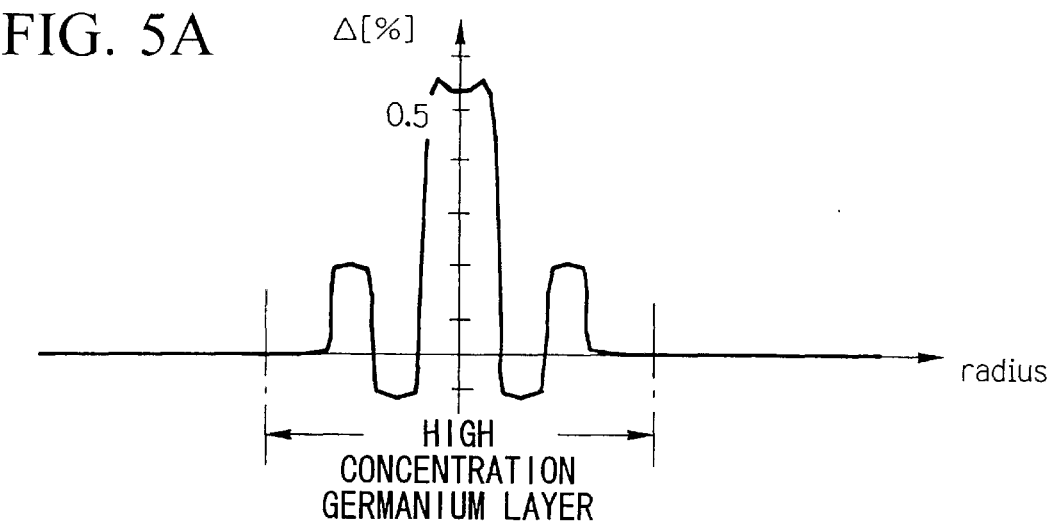
FIG. 5A is a graph showing a refractive index profile of an optical fiber in Example 1.
Figure 5B:
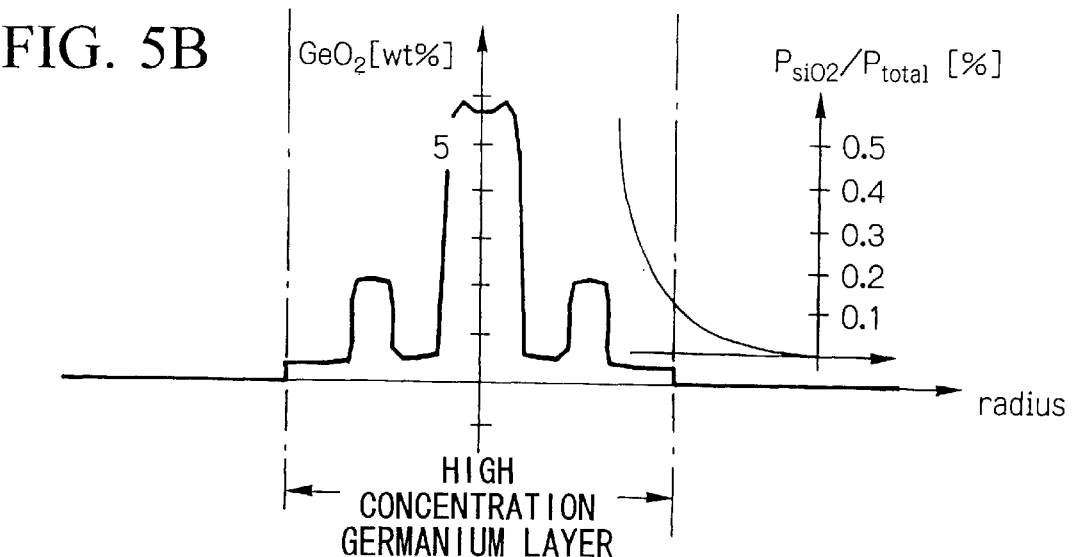
FIG. 5B is a graph showing a concentration distribution of germanium oxide in the optical fiber.

FIG. 5A shows the refractive index profile, and FIG. 5B shows the concentration distribution of germanium oxide. In this optical fiber, germanium oxide and fluorine were added together into a core and an intermediate layer and the respective concentrations of germanium oxide and fluorine in each layer were controlled, so as to produce a layer in which the relative refractive index difference based on the low concentration germanium layer (clad) was −0.1% or less while maintaining the concentration of germanium oxide to be 0.1% by weight or more.

The ratio of the optical power leaking from the high concentration germanium layer to the low concentration germanium layer was set to be approximately 0.1%, relative to the total optical power.

In this optical fiber, the external diameter of the core was 16.3 $\mu$m, the external diameter of the intermediate layer was 23.1 $\mu$m, and the external diameter of the intermediate layer was approximately 2.75 times that of the MFD (8.4 $\mu$m).

Then, the optical fiber was exposed to hydrogen, and the wavelength loss properties thereof were measured.

Figure 6:
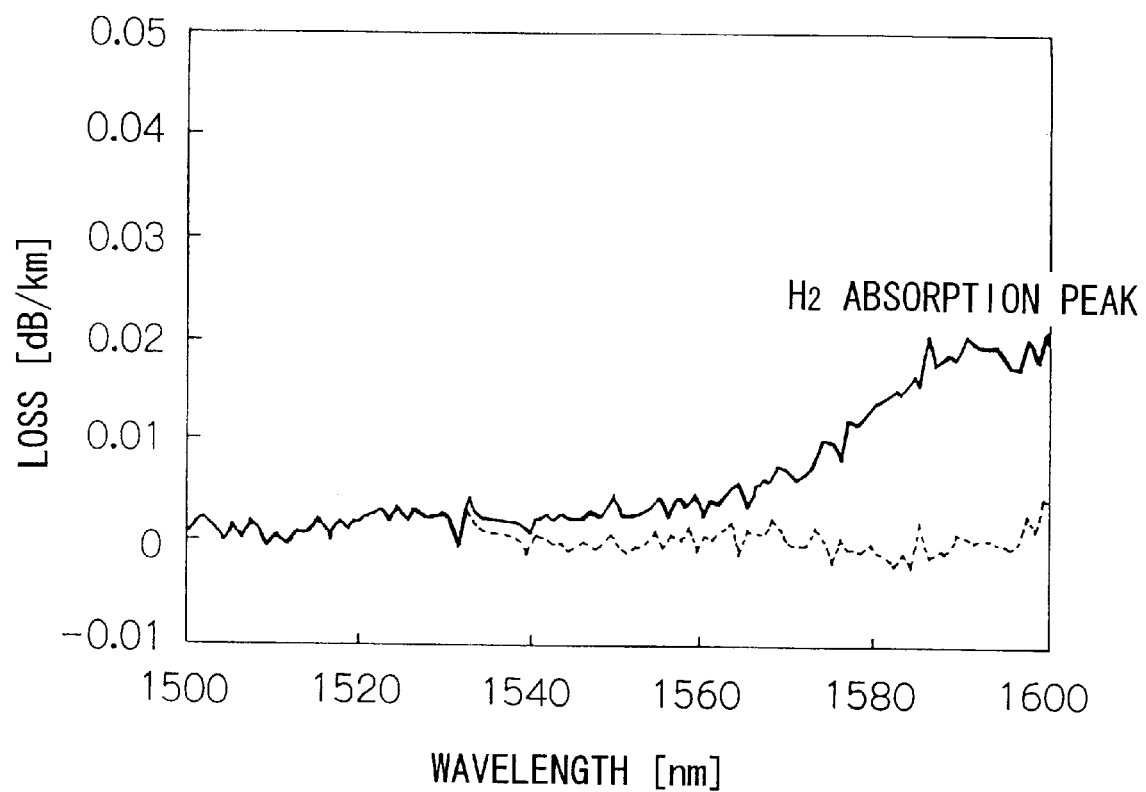
FIG. 6 is a graph showing the relationship between the wavelength and the magnitude of the loss increase in the optical fiber of Example 1.
Figure 12:
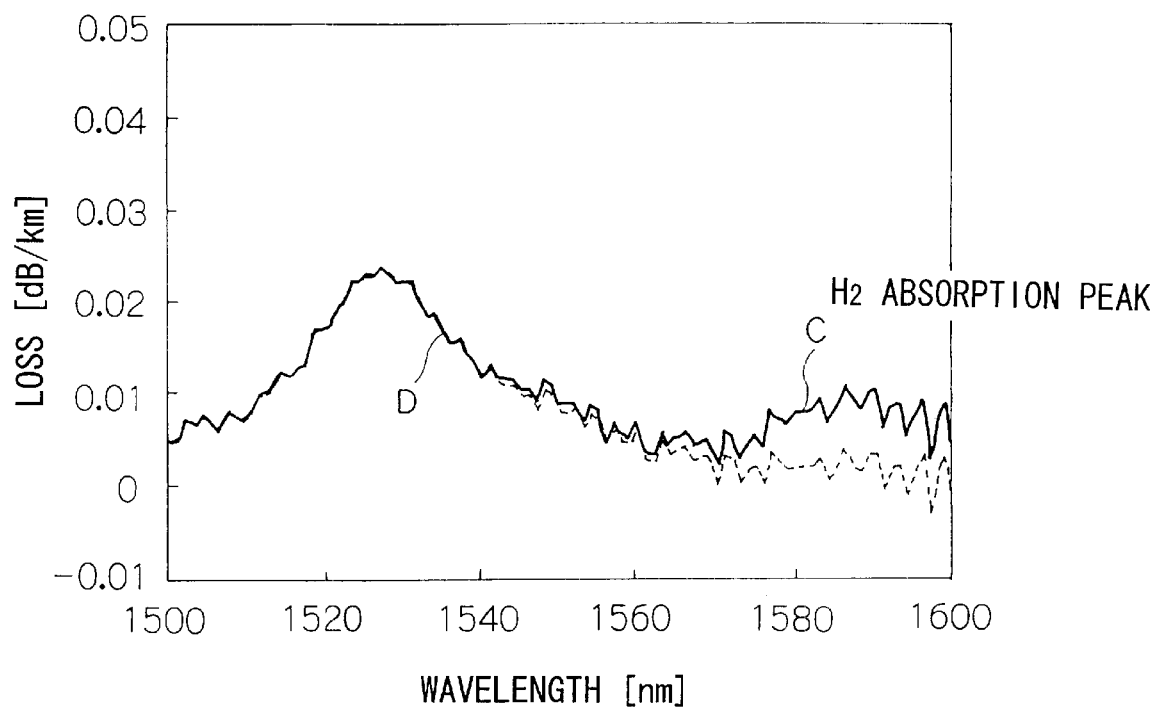
FIG. 12 is a graph showing the relationship between the wavelength and the magnitude of the loss increase which is calculated by subtracting the magnitude of the loss increase caused by only an effect of hydrogen from the magnitude of the loss increase of the optical fiber before and after hydrogen exposure, which is shown in FIG. 11.

FIG. 6 shows the same graph as that of FIG. 12, in which the continuous line shows the magnitude of the loss increase after hydrogen exposure and the broken line shows the magnitude of the loss increase calculated by subtracting the loss increase caused by only an effect of hydrogen from the loss increase after hydrogen exposure.

The magnitude of the loss increase near 1530 nm, which is caused by linkage between peroxyl radical and hydrogen, was 0.0001 dB/km or less, and improved hydrogen-resistance properties were achieved.

Example 2

According to a VAD method, an optical fiber preform was produced and was then drawn to produce an optical fiber. This optical fiber had optical properties similar to that of Sample 3 shown in Table 1 and FIG. 4.

Figure 7A:
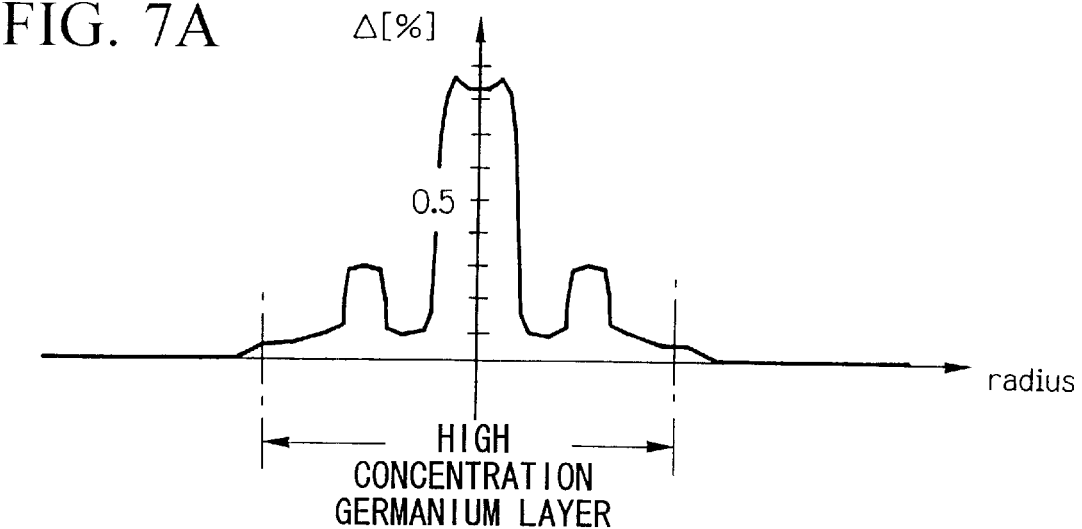
FIG. 7A is a graph showing a refractive index profile of an optical fiber in Example 2.
Figure 7B:
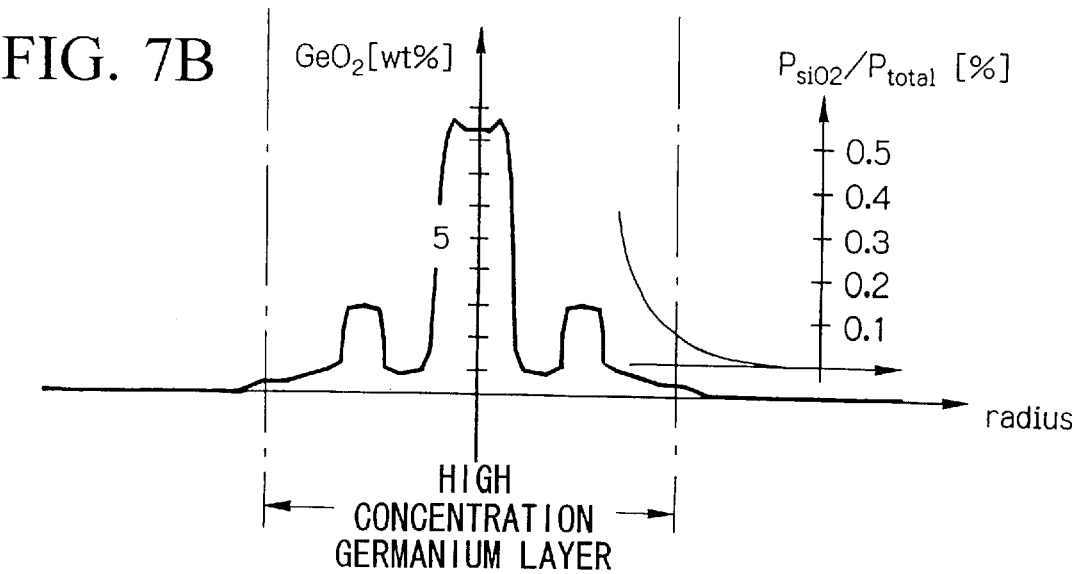
FIG. 7B is a graph showing a concentration distribution of germanium oxide in the optical fiber.

FIG. 7A shows the refractive index profile, and FIG. 7B shows the concentration distribution of germanium oxide. In this optical fiber, since only germanium oxide was added into a core and an intermediate layer, the refractive index profile and the respective concentration of germanium oxide were identical to each other. The ratio of the optical power leaking from the high concentration germanium layer to the low concentration germanium layer was set to be approximately 0.1%, relative to the total optical power.

In this optical fiber, the external diameter of the core was 14.6 μm, the external diameter of the intermediate layer was 25.1 μm, and the external diameter of the intermediate layer was approximately 2.7 times that of the MFD (9.3 μm).

Figure 8:
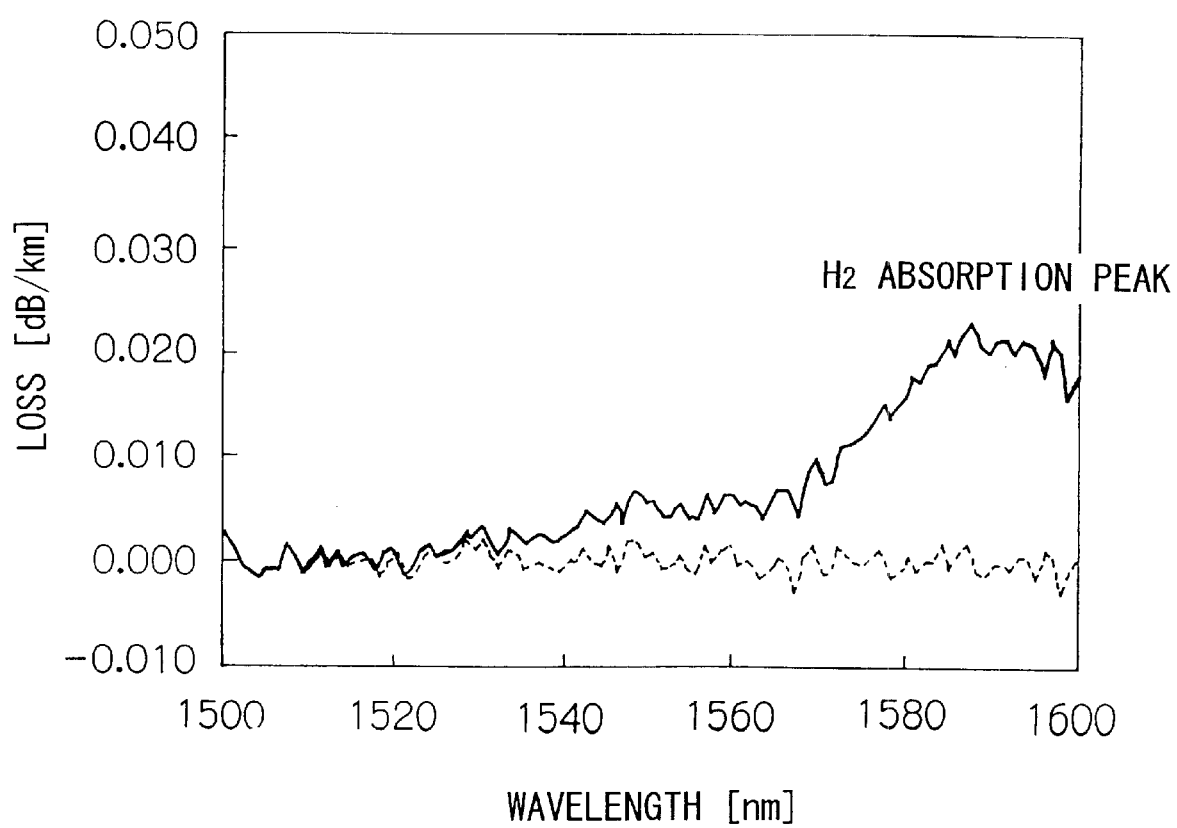
FIG. 8 is a graph showing the relationship between the wavelength and the magnitude of the loss increase in the optical fiber of Example 2.

Then, the optical fiber exposed to hydrogen and the wavelength loss properties thereof were measured. FIG. 8 shows a graph similar to that of FIG. 6. As shown in this graph, the magnitude of the loss increase caused by linkage between peroxyl radical and hydrogen was too small to be observed.

Example 3

According to an MCVD method, an optical fiber preform was produced from silica glass and was then drawn to produce an optical fiber. This optical fiber had optical properties similar to that of Sample 1 shown in Table 1 and FIG. 4.

Figure 9A:
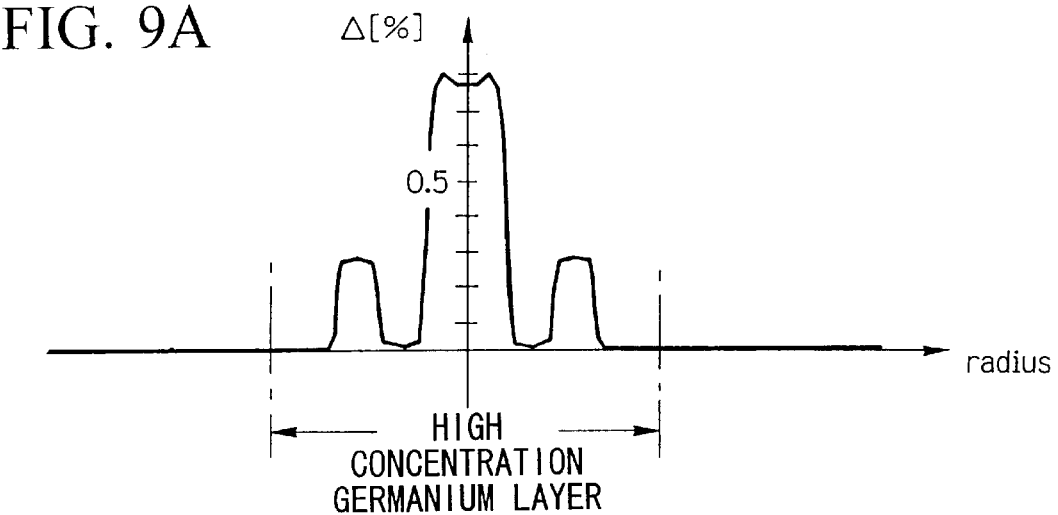
FIG. 9A is a graph showing a refractive index profile of an optical fiber in Example 3.
Figure 9B:
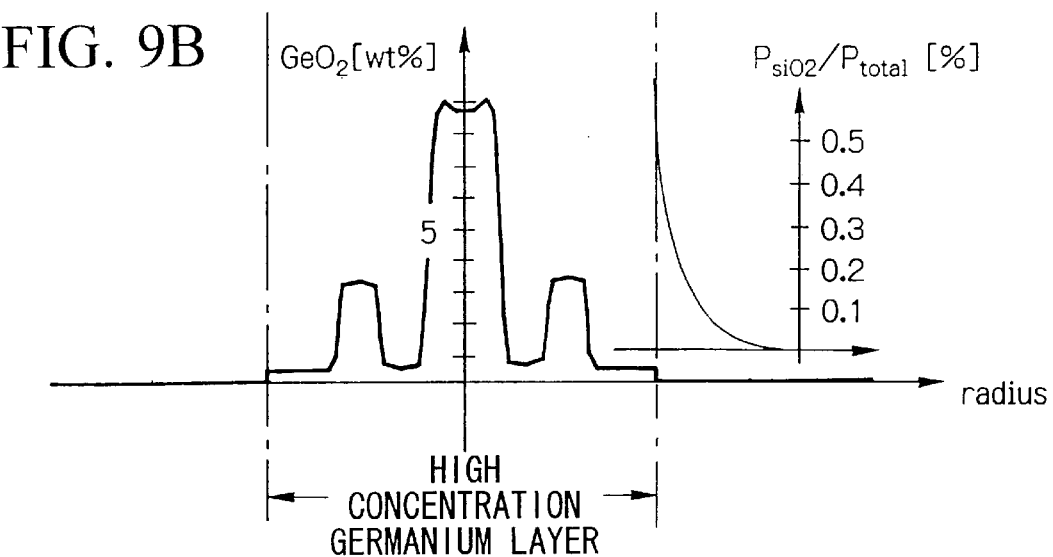
FIG. 9B is a graph showing a concentration distribution of germanium oxide in the optical fiber.

FIG. 9A shows the refractive index profile, and FIG. 9B shows the concentration distribution of germanium oxide. In this optical fiber, trace amounts of fluorine were added together with germanium oxide into a core and an intermediate layer, and the respective concentration of germanium oxide and fluorine of each layer was controlled.

In this optical fiber, the external diameter of the core was 15.7 μm, the external diameter of the intermediate layer was 24.3 μm, and the external diameter of the intermediate layer was approximately 2.6 times that of the MFD (9.3 μm). The ratio of the optical power leaking from the high concentration germanium layer to the low concentration germanium layer was set to be approximately 0.4%, relative to the total optical power.

Figure 10:
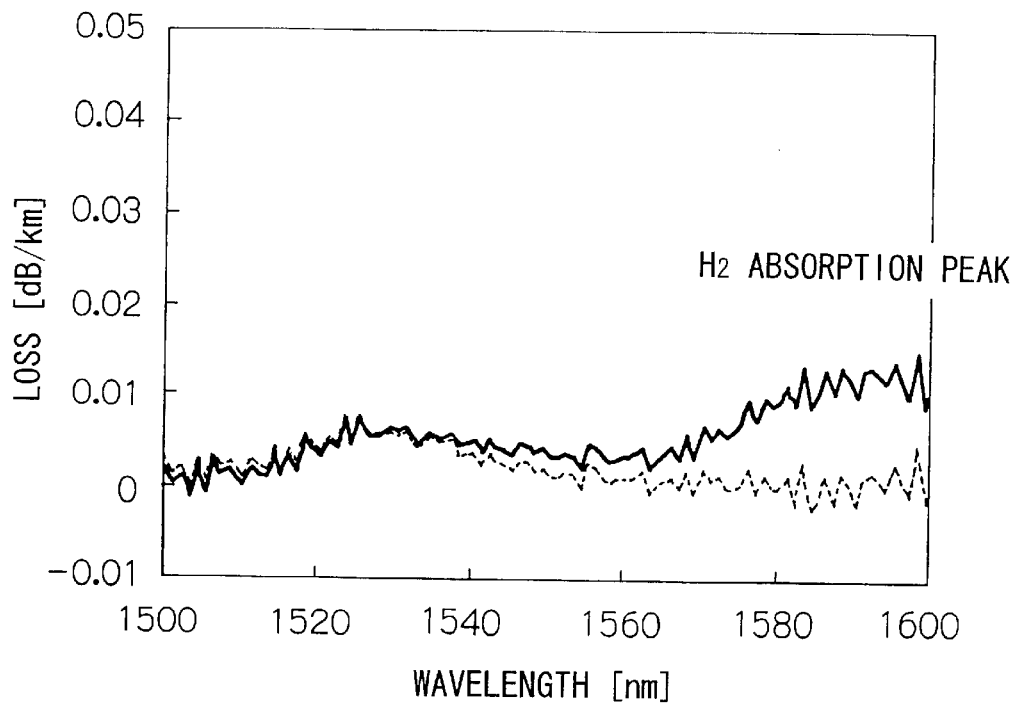
FIG. 10 is a graph showing the relationship between the wavelength and the magnitude of the loss increase in the optical fiber of Example 3.

Then, the optical fiber was exposed to hydrogen and the wavelength loss properties thereof were measured. FIG. 10 shows a graph similar to that of FIG. 6. As shown in this graph, the magnitude of the loss increase caused by linkage between peroxyl radical and hydrogen was approximately 0.008 dB/km, which was a little larger than those in Examples 1 and 2. By comparison of these examples, it was anticipated that the external diameter of the high concentration germanium layer may be set to be larger so as to suppress the additional loss increase.

As described above, by setting the ratio of the optical power leaking from the high concentration germanium layer to the low concentration germanium layer to be 0.4% or less, relative to the total optical power propagating through the optical fiber, or alternatively, by setting the external diameter of the high concentration germanium layer to be at least 2.6 times that of the mode field diameter in the employed wavelength band, the hydrogen-resistance properties of the optical fiber can be improved. Specifically, the magnitude of the loss increase near 1530 nm, which is caused by linkage between peroxyl radical and hydrogen, can be decreased to an approximately negligible level.

There are no limitations imposed on the refractive index profile, and various refractive index profiles can be used. Moreover, it is possible to use a complicated refractive index profile by adding a dopant such as fluorine together with germanium oxide into at least one of the high concentration germanium layer including the core and the intermediate layer, as necessary.

What is claimed is:

1. An optical fiber comprising a high concentration germanium layer and a low concentration germanium layer, wherein the high concentration germanium layer is disposed at a central position of the optical fiber and contains germanium oxide in a concentration of 0.1% by weight or more, relative to the total weight of the high concentration germanium layer, the low concentration germanium layer is disposed around the high concentration germanium layer and contains germanium oxide in a concentration of less than 0.1% by weight, relative to the total weight of the low concentration germanium layer, the ratio of optical power leaking from the high concentration germanium layer to the low concentration germanium layer in an employed wavelength band is 0.4% or less, relative to the total optical power propagating through the optical fiber.

2. An optical fiber according to claim 1, wherein the low concentration germanium layer includes a clad, the high concentration germanium includes a core and an intermediate layer disposed between the core and the clad, and the maximum refractive index of the core is at least 0.25% higher than that of the intermediate layer.

3. An optical fiber according to claim 1, wherein a dopant other than germanium oxide is added together with the germanium oxide in the high concentration germanium layer.

4. An optical fiber comprising a high concentration germanium layer and a low concentration germanium layer, wherein the high concentration germanium layer is disposed at a central position of the optical fiber and contains germanium oxide in a concentration of 0.1% by weight or more, relative to the total weight of the high concentration germanium layer, the low concentration germanium layer is disposed around the high concentration germanium layer and contains germanium oxide in a concentration of less than 0.1% by weight, relative to the total weight of the low concentration germanium layer, an external diameter of the high concentration germanium layer is at least 2.6 times that of a mode field diameter in an employed wavelength band.

5. An optical fiber according to claim 4, wherein the low concentration germanium layer includes a clad, the high concentration germanium includes a core and an intermediate layer disposed between the core and the clad, and the maximum refractive index of the core is at least 0.25% higher than that of the intermediate layer.

6. An optical fiber according to claim 4, wherein a dopant other than germanium oxide is added together with the germanium oxide in the high concentration germanium layer.

* * * * *